Oct. 27, 1964  G. W. DEITH  3,153,915
FREEZING TRAYS
Filed Aug. 22, 1960

INVENTOR
GEOFFREY WILSON DEITH
BY
Brumbaugh, Free, Graves & Donohue
HIS ATTORNEYS United States Patent Office 3,153,915
Patented Oct. 27, 1964

3,153,915
FREEZING TRAYS
Geoffrey Wilson Deith, Caister-on-Sea, Great Yarmouth, England, assignor to Lever Brothers Company, New York, N.Y., a corporation of Maine
Filed Aug. 22, 1960, Ser. No. 51,064
Claims priority, application Great Britain Aug. 21, 1959
1 Claim. (Cl. 62—355)

This invention relates to the manufacture of receptacles such as trays, boxes and other containers useful for freezing comestibles and the like and it relates particularly to receptacles formed at least in part of relatively non-heat conductive materials such as thermo-setting synthetic resins, thermo-plastic synthetic resins and the like.

In accordance with the present invention, the new receptacles are formed synthetic resins which may be suitably reinforced or filled with such materials as glass fibers, cotton fibers, wood flour, textile fabrics or the like and containing as heat conductive elements, metallic inserts which may be in the form of a woven mesh or expanded metal, corrugated or coiled wires, rods or the like which are exposed at both surfaces of the receptacle in order to form heat conductive paths for rapidly transferring heat from the inside of the receptacle to the outside thereof.

More particularly, in accordance with the invention, the metallic inserts may be assembled in the form of a receptacle, such as a tray, box or the like and layers or sheets of synthetic resinous materials such as partially set thermo-setting resins, thermo-plastic resins or catalyst activated resins, with or without reinforcing fibers, fillers or the like, are applied to opposite sides of the metallic assembly and pressed thereinto to form a receptacle of a desired shape and size. Inasmuch as the sheets or layers of resinous material normally cover all of the surfaces of the metallic insert or inserts, the inner and outer surfaces of the receptacle are subjected to a grinding operation, after hardening of the resinous material, to uncover portions of the metallic insert or inserts at the inside and the outside of the receptacle to form a multiplicity of heat conductive paths through the walls of the container. In this way, it is possible to provide sturdy trays, boxes, containers and other receptacles which are almost as heat-conducting as though they were made completely of metal. Such containers have inert plastic surfaces which do not contaminate and are not affected by the materials which are frozen or otherwise treated therein. Inasmuch as the receptacles are relatively impervious and inert, they are easily cleaned and kept in a sanitary condition.

Such receptacles can be manufactured at relatively low cost as compared with similar receptacles formed of stainless steel and other non-rusting or corrodible metals which have been used heretofore in quick freezing apparatus.

For a better understanding of the present invention reference may be had to the accompanying drawing in which.

Figure 1:
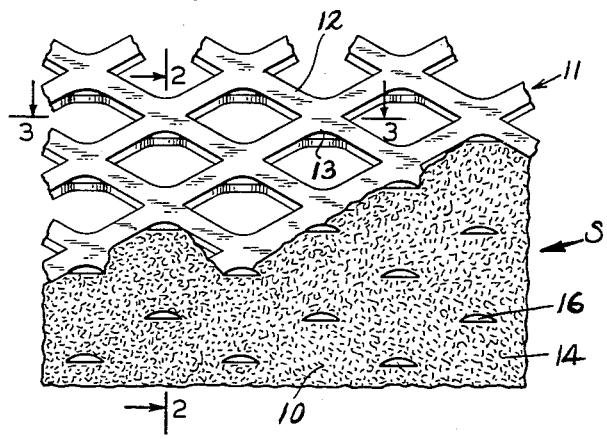
FIGURE 1 is a plan view of a portion of a composite sheet of conductive and non-conductive materials with a portion of the non-conductive material broken away to show the heat-conductive grid therein.
Figure 2:
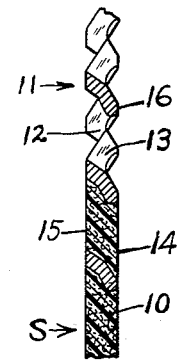
FIGURE 2 is a view in section taken on line 2—2 of FIGURE 1.

Referring now to the drawings, FIGURES 1 and 2 illustrate a sheet S of a composite material which is composed of resin-bonded fiber glass 10 reinforced by a sheet 11 of expanded metal. Some of the resin-bonded fiber glass is removed to show the expanded metal. The sheet of expanded metal has a multiplicity of meshes 12 each having a junction part 13 which extends from one surface 14 of the sheets to the other surface 15. The junction part 13 is disposed or canted at an acute angle to the plane of the sheet. A small area 16 of each junction part 13 is exposed at each surface 14 and 15 of the sheet so that heat can readily pass along the grid or mesh from one side of the composite sheets to the other.

Figure 3:
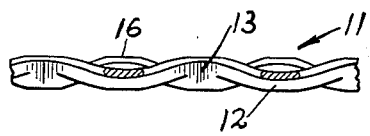
FIGURE 3 is a view in section taken on line 3—3 of FIGURE 1.
Figure 5:
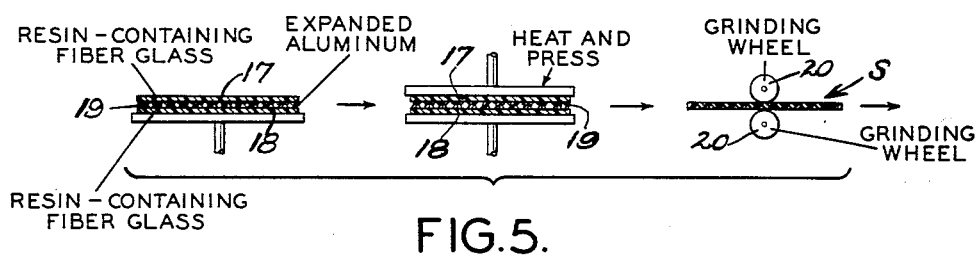
FIGURE 5 is a schematic showing of a typical method of manufacturing the composite material for the receptacles.

As illustrated in FIGURE 5, sheet materials of the type shown in FIGURES 1, 2 and 3 can be made by laying open-weave fiber glass mats 17 and 18 containing a partially set thermo-setting resin, a thermo-plastic resin, or a catalyst activated resin on each side of a sheet of expanded metal 19 of the type shown in FIGURES 1 and 2. The resin for bonding the fiber glass mat may be any of the synthetic resins used for bonding fiber glass such as, for example, a partially condensed phenol-formaldehyde resin, thermo-plastic polystyrene or polyvinyl chloride resin, a catalyst activated epoxy resin or the like.

The sandwich formed of the resin-containing layers 17 and 18 of fiber glass and the metal mesh 19 are subjected to pressure or heat and pressure, as may be required by the resin present. The fiber glass mats and the resin are forced into the interstices of the metal mesh 19, filling it completely and covering the mesh. Inasmuch as such a filling and bonding leaves little or none of the mesh exposed at the surface, the compressed sheet, after setting, in the case of a thermo-setting resin, or hardening, in the case of a thermo-plastic resin or a catalyst-activated resin, is passed between grinding wheels 20 to grind away the surface of the composite article and thereby expose the portions of the mesh corresponding to the means 16 at the opposite surfaces of the sheet. In the grinding operation, the crests of the corrugations in the sheet are ground off somewhat thereby increasing the area thereof exposed at opposite surfaces of the article for transmittal of heat from the interior to the exterior.

In a typical composite sheet, the mesh may be expanded aluminum of slightly more than ⅛ inch thickness overall so that when the composite sheet is formed and its surfaces ground, it will have a thickness of about ⅛ of an inch. The mesh size of the expanded aluminum is such that it will be exposed at about 15 places per square inch of surface of the composite sheet thereby giving on each side a total area of 0.2 square inch of aluminum exposed per square inch of surface.

Figure 4:
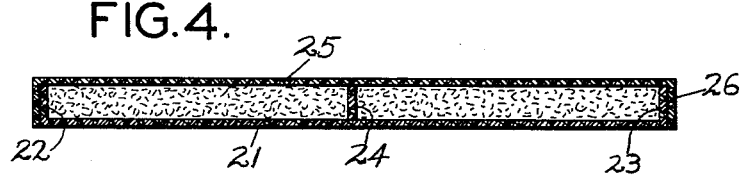
FIGURE 4 is a view in cross-section of a typical receptacle embodying the present invention useful for freezing comestibles.

This typical material can be shaped by bending, cementing or otherwise treating to produce trays, boxes, containers or other receptacles therefrom. Preferably the aluminum mesh is shaped into the form of a box-like member having a bottom and side walls around its perimeter and the resin or plastic or the reinforced resin or plastic is molded around the formed sheets. Thus, as shown in FIGURE 4, a tray having a bottom 21, side walls 22, 23, etc., extending around its perimeter and a central partition 24 is formed of expanded aluminum and is then impregnated with the resinous material reinforced or not, as described above, after which its inner and outer surfaces are ground to expose the mesh at the inside and the outside thereof. In the same way a cover 25 is formed with flanges 26 around its edge which telescope over the side walls 22 and 23 of the container.

A typical tray for freezing operations may be 15 inches wide by 40 inches long and has side walls 22 and 23 and a center partition 24 seven-eighths of an inch high across the middle of the tray. The cover 15 measures 15¼ inches by 40¼ inches and has downwardly depending side flanges seven-eighths of an inch high.

The compartments of the tray may be packed with fillets of fish or other products to be frozen and the cover 25 is placed on the filled tray so that both the lid and the bottom of the tray press against the fish or other products. The tray is placed between two plates of a multi-plate freezer which are moved into contact with the top and bottom of the tray to freeze the product. Inasmuch as the major portions of the surfaces of the receptacles are relatively inert synthetic resin or plastic, the receptacles have little or no tendency to discolor or otherwise modify the product being frozen therein. Likewise, the receptacles are not discolored or contaminated by the products packed therein. Cleaning of the receptacles is facilitated due to the smoothly ground surfaces of the tray and the relatively impervious nature of the resinous material and the exposed portions of the inserts or heat conductive elements therein.

It will be understood that the resinous material from which the tray is principally formed is susceptible to considerable modification in its composition and in the reinforcing materials therefor. Moreover, the aluminum or other metallic heat-conducting element used in the tray can be varied quite substantially. Thus, coils of wire, woven mesh, or the like can be used instead of the expanded metal disclosed herein. Accordingly, the example of the invention given herein should be considered as illustrative and not as limiting.

I claim:

A composite heat-conductive freezing receptacle comprising means forming an enclosure, said enclosure-forming means being composed of a hardened synthetic resin and containing an expanded metallic mesh insert having portions thereof exposed at the inside and outside of said receptacle at spaced-apart intervals substantially over the entire inside and outside surfaces of said enclosure-forming means to form continuous heat-conductive paths therethrough, the total area of metal exposed on each side being substantially 0.2 square inch per square inch of enclosure-forming-means surface.

References Cited in the file of this patent
UNITED STATES PATENTS

| | | |
|---|---|---|
| 1,905,602 | Patterson | Apr. 25, 1933 |
| 2,027,754 | Smith | Jan. 14, 1936 |
| 2,704,928 | Curry | Mar. 29, 1955 |
| 2,740,188 | Simmons | Apr. 3, 1956 |
| 2,747,701 | Newell | May 29, 1956 |
| 2,759,247 | Grenell et al. | Aug. 21, 1956 |
| 2,797,178 | Noyes et al. | June 25, 1957 |
| 2,836,529 | Morris | May 27, 1958 |
| 2,879,041 | Ross | Mar. 24, 1959 |
| 2,902,266 | Isham | Sept. 1, 1959 |